United States Patent
Dutot et al.

(10) Patent No.: US 11,465,464 B2
(45) Date of Patent: Oct. 11, 2022

(54) COMPACT COANDA EFFECT VENTILATION DEVICE FOR MOTOR VEHICLE INCORPORATING A CONTROL MODULE PROVIDED WITH A CONTROL PANEL

(71) Applicants: PSA AUTOMOBILES SA, Poissy (FR); FAURECIA INTERIEUR INDUSTRIE, Nanterre (FR)

(72) Inventors: Christophe Dutot, Vitry sur Seine (FR); Philippe Barre, Joinville le Pont (FR); Christophe Brunard, Bois Colombes (FR); Julien Beauregard, Mesnil en Thelle (FR); Jean Christophe Le Flohic, Rueil Malmaison (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 16/956,495

(22) PCT Filed: Nov. 26, 2018

(86) PCT No.: PCT/EP2018/082501
§ 371 (c)(1),
(2) Date: Jun. 19, 2020

(87) PCT Pub. No.: WO2019/120891
PCT Pub. Date: Jun. 27, 2019

(65) Prior Publication Data
US 2021/0094381 A1  Apr. 1, 2021

(30) Foreign Application Priority Data
Dec. 21, 2017 (FR) ...................... 1762883

(51) Int. Cl.
*B60H 1/00* (2006.01)
*B60H 1/34* (2006.01)
*B60K 37/06* (2006.01)

(52) U.S. Cl.
CPC ....... *B60H 1/0065* (2013.01); *B60H 1/00457* (2013.01); *B60H 1/3421* (2013.01);
(Continued)

(58) Field of Classification Search
CPC ............. B60H 1/0065; B60H 1/00457; B60H 1/3421; B60H 2001/3471;
(Continued)

(56) References Cited

U.S. PATENT DOCUMENTS

| 2014/0199932 A1 | 7/2014 | Mercey et al. |
| 2014/0357179 A1* | 12/2014 | Londiche ............... F24F 13/075 454/322 |

(Continued)

FOREIGN PATENT DOCUMENTS

| DE | 102004014899 A1 * | 5/2005 | ............... B60H 1/34 |
| DE | 102004014899 A1 | 5/2005 | |

(Continued)

OTHER PUBLICATIONS

International Search Report corresponding to International application No. PCT/EP2018/082501, dated Feb. 15, 2019, 4 pages.

(Continued)

*Primary Examiner* — Steven S Anderson, II
(74) *Attorney, Agent, or Firm* — Reising Ethington P.C.

(57) ABSTRACT

A ventilation device includes at least one aerator having a channel capable of conveying an air flow from an inlet opening to an outlet opening, a hollow air guiding core housed in the channel and defining two air guiding surfaces delimiting, with this channel, two flow paths capable of transporting, respectively, to the outlet opening, first and (Continued)

second quantities of air from the inlet opening, a fin mounted so as to be able to pivot upstream from the core and arranged so as to make it possible to adjust the ratio between the first and second quantities of air, depending on the position of same, and a control module incorporated at least partially into the core of at least the aerator and having a control panel constituted at least partially by a downstream end wall of the core and being provided with a control device.

12 Claims, 2 Drawing Sheets

(52) U.S. Cl.
CPC ........ *B60K 37/06* (2013.01); *B60K 2370/126* (2019.05); *B60K 2370/1446* (2019.05)

(58) Field of Classification Search
CPC ...... B60K 2370/1446; B60K 2370/126; B60K 2370/139; B60K 2370/1523; B60K 2370/658; B60K 37/06; B60K 35/00
See application file for complete search history.

(56) References Cited

U.S. PATENT DOCUMENTS

| 2016/0288624 | A1* | 10/2016 | Albin | ................... B60H 1/3421 |
| 2019/0168583 | A1* | 6/2019 | Dinant | ................. B60H 1/3428 |

FOREIGN PATENT DOCUMENTS

| DE | 102012020539 A1 * | 4/2014 | ........... B60H 1/3414 |
| DE | 102012020539 A1 | 4/2014 | |
| DE | 102017111011 A1 | 7/2017 | |
| EP | 3085559 A2 | 10/2016 | |
| FR | 2956065 A1 | 8/2011 | |
| FR | 3028810 A1 | 5/2016 | |
| FR | 3031935 A1 * | 7/2016 | ............. B60K 37/06 |
| FR | 3031935 A1 | 7/2016 | |
| WO | WO0021765 | 4/2000 | |

OTHER PUBLICATIONS

French Search Report corresponding to French application No. FR 1762883, dated Sep. 14, 2018, 2 pages.
Written Opinion corresponding to International application No. PCT/EP2018/082501, dated Feb. 15, 2019, 6 pages.

* cited by examiner

COMPACT COANDA EFFECT VENTILATION DEVICE FOR MOTOR VEHICLE INCORPORATING A CONTROL MODULE PROVIDED WITH A CONTROL PANEL

TECHNICAL FIELD

The present invention relates generally to aeration devices intended to diffuse, in the passenger compartment of a motor vehicle, air coming from a heating, ventilation and air conditioning system of said vehicle.

BACKGROUND

Such an aeration device, known for example from French patent application FR 2,956,065, conventionally includes at least one aerator comprising a channel delimited by a hollow body and able to convey an air flow to an outlet opening emerging in the passenger compartment of the vehicle, as well as at least one deflector fin mounted rotating in this channel near the outlet opening. The aerator also comprises an actuator mechanically connected to this or these fin(s) and allowing the user to control the rotation thereof so as to orient the flow of air leaving the body.

A concealing flap controllable by a dedicated control mechanism is further generally mounted pivoting in the duct upstream from this or these fin(s) between a maximum open position and a closed position preventing the conveyed air flow from escaping through the outlet opening.

These aerators, which generally emerge on the dashboard of the vehicle, are unattractive and negatively affect the quality level perceived by the users.

In order to address these drawbacks, U.S. Pat. Application Publication No. 2014/0357179 describes an aeration device implementing the physics phenomenon known as the "Coanda" effect, according to which a flow guided while attaching itself to curved surfaces has a low head loss and thus generates little noise.

It has the advantage of being particularly attractive (only the end of the core remain visible to users, while the other mechanical elements are in turn hidden), which makes it possible to significantly improve the perceived quality level of the entire dashboard of the vehicle.

The control of such an aeration device is conventionally provided by means of a control module integrated into the center console of the vehicle. Such a module, described for example in international patent application publication WO 00/21765, comprises a plurality of control means making it possible to adjust certain parameters, such as the ventilation air flow rate leaving the aerator and the setpoint temperature for the zone of the passenger compartment treated by this aerator.

These control modules nevertheless have the drawback of being cumbersome, in particular in terms of the center console of the vehicle, where they considerably reduce the available space.

SUMMARY

The present invention therefore aims to improve the situation.

To that end, there is provided an aeration device for the heating, ventilation and air conditioning system for a motor vehicle, including at least one aerator, comprising:

a channel capable of conveying an air flow from an inlet opening to an outlet opening emerging in an enclosure;

a hollow air guiding core housed in said channel and defining two air guiding surfaces opposite one another, said two guiding surfaces and said channel thus delimiting two flow paths capable of transporting, respectively, to said outlet opening, first and second quantities of air coming from said inlet opening;

a first fin mounted pivoting upstream from said guiding core and arranged so as to make it possible to adjust, as a function of its position, the ratio between the first and second quantities of air;

characterized in that said aeration device includes a control module integrated at least partially into the guiding core of at least said aerator, said control module comprising a control panel constituted at least partially by a downstream end wall of said guiding core and being equipped with a control device making it possible to control the heating, ventilation and air conditioning system.

By at least partially integrating the control module of the heating, ventilation and air conditioning system into the guiding core of one or several aerators, the aeration device makes it possible, without affecting the passage section of the air flow delivered into the passenger compartment by this or these aerators, to free space, in particular at the center console of the vehicle, for example to install zones therein for accommodating roaming devices or for additional storage.

According to preferred features of said aeration device:

said control device includes at least one pushbutton and an adjusting ring mounted rotating around said pushbutton;

said control device includes at least one slidable knob;

said control device includes at least one touch-sensitive zone control device;

said control panel includes at least one display zone provided with one or several lighted indicators each displaying the selected value of one of the adjustment parameters of said heating, ventilation and air conditioning system;

said control module includes a control device making it possible to control other functional devices of said vehicle;

the at least said aerator includes rows of second parallel deflector fins mounted pivoting in said channel along axes of rotation perpendicular to that of said first fin and secured in rotation via connecting means connecting them to one another;

said aeration device includes two said aerators arranged side by side and separated by a partition and intended to diffuse air in the passenger compartment of the motor vehicle, respectively on the driver's side and on the front passenger's side;

said panel extends continuously between the two said aerators; and/or

According to a second aspect, the invention also relates to a motor vehicle including one such aeration device.

BRIEF DESCRIPTION OF THE DRAWINGS

The description of the invention will now be continued through the detailed description of one exemplary embodiment, provided hereinafter as an illustration but non-limitingly, in reference to the appended drawings, in which.

DETAILED DESCRIPTION

The aeration device 1 shown in the figures is intended to be installed in the central part of the dashboard (not shown) of a motor vehicle in order to diffuse, in the passenger compartment of this vehicle, pulsed air coming from the heating, ventilation and air conditioning (HVAC) system of this vehicle.

Figure 1:
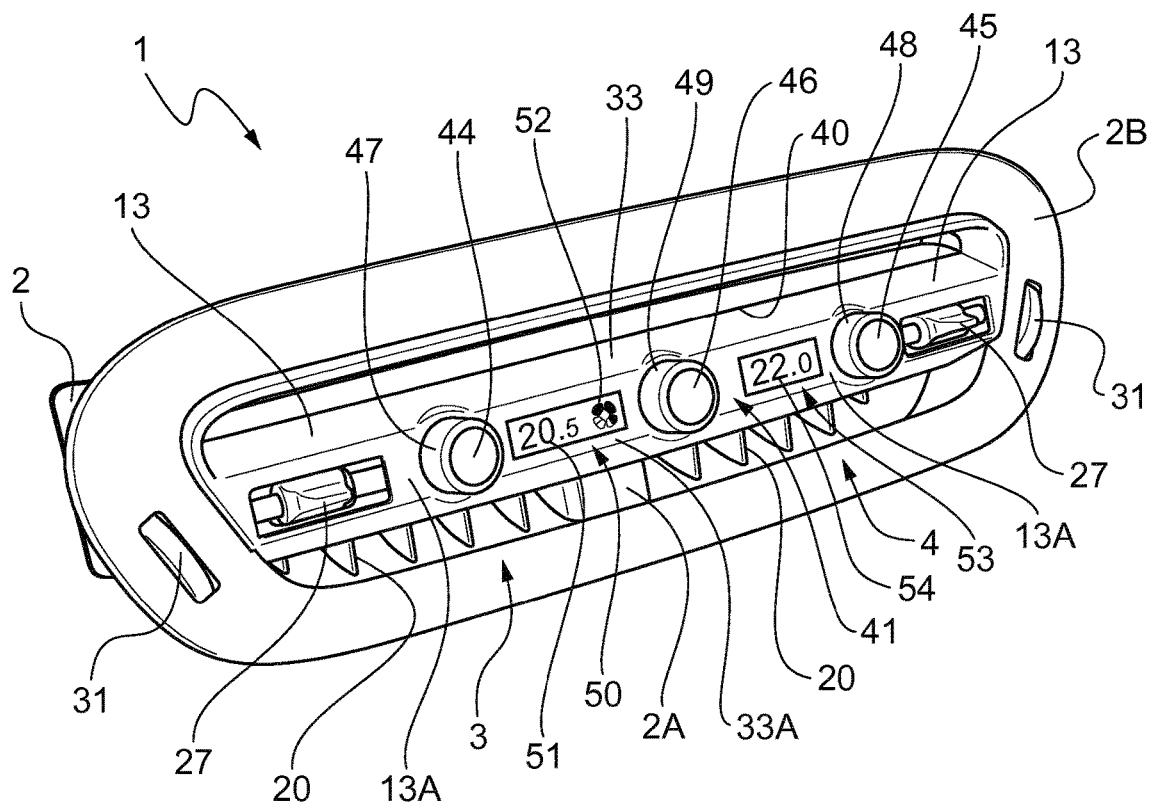
FIG. 1 shows a perspective view of an aeration device for a motor vehicle according to an embodiment of the invention.

As illustrated in FIG. 1, the aeration device 1 includes a hollow body 2 housing two similar aerators 3, 4 arranged side by side while being separated by a partition 2A and intended to diffuse air in the passenger compartment of the motor vehicle, respectively on the driver's side and the front passenger's side.

Figure 2:
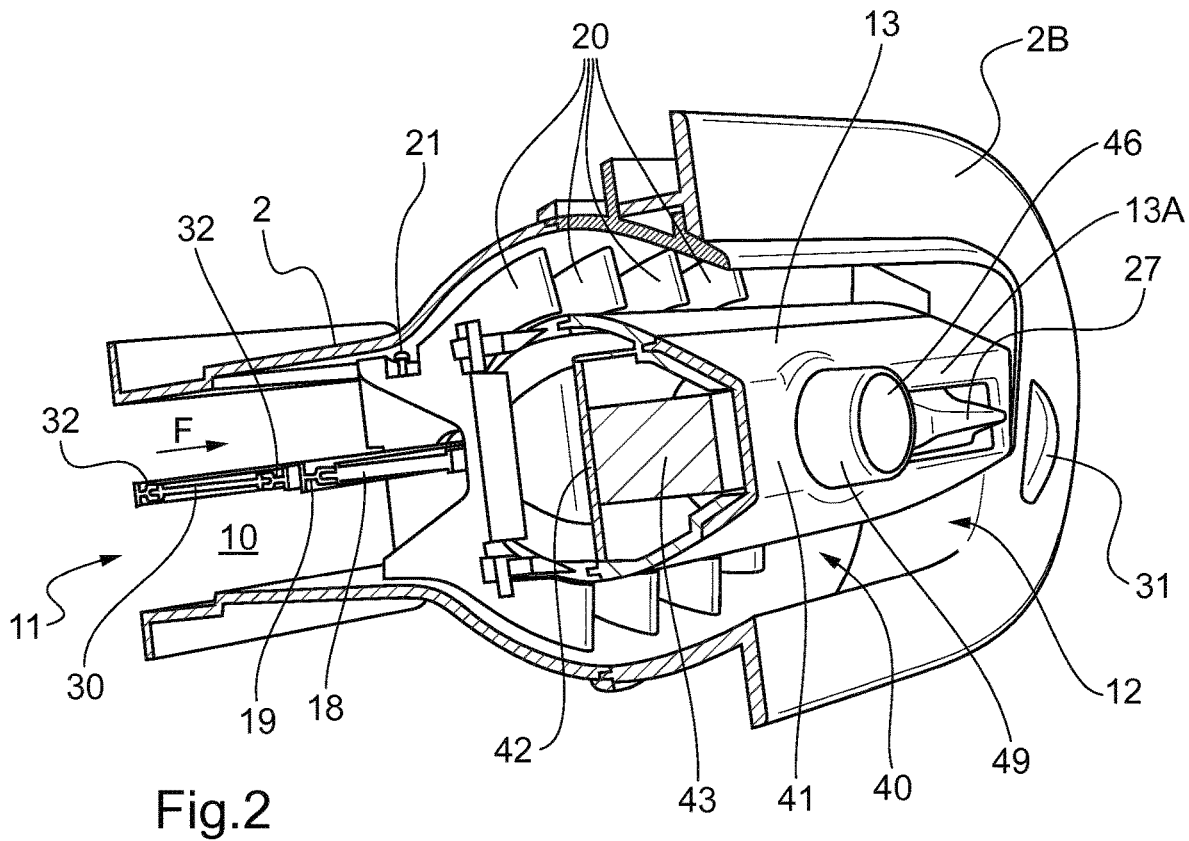
FIG. 2 is a perspective sectional view of the aeration device of FIG. 1 in an axial vertical plane.

Each aerator 3, 4 comprises a channel 10 delimited by the body 2 and able to channel an air flow F from an inlet opening 11 to an outlet opening 12 emerging in the passenger compartment of the vehicle (FIG. 2).

In the remainder of this disclosure, the terms "upstream" and "downstream" used to characterize the position of certain elements of the aeration device 1 are to be considered relative to the circulation direction of the air flow path in the channels 10.

Figure 3:
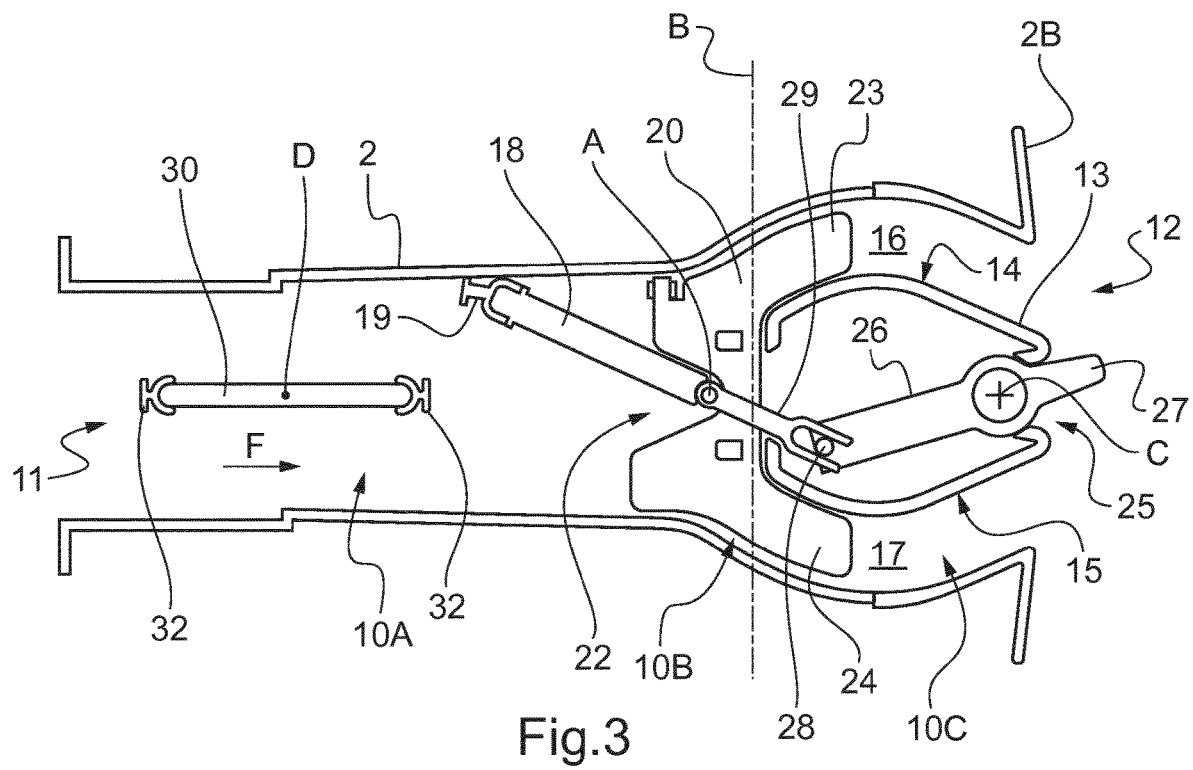
FIG. 3 shows a sectional view of the aeration device of FIG. 1 in an axial vertical plane located at the knob used for adjusting the orientation of the fins of the aerator for the front passenger.

As illustrated in FIG. 3, each channel 10 successively comprises, from the inlet opening 11 to the outlet opening 12, an upstream segment 10A, an intermediate segment 10B and a downstream segment 10C.

The upstream segment 10A has a constant rectangular cross-section over its entire length.

The intermediate segment 10B has a flared section in the circulation direction of the air flow F in the channel 10, while that of the downstream section 10C becomes narrower in the circulation direction of the air flow F.

Each aerator 3, 4 also includes a hollow air guiding core 13 preferably having a substantially ovoid section and being housed in the intermediate 10B and downstream 10C segments of a corresponding channel 10 while advantageously being rigidly connected to the latter.

Each core 13 defines a first air guiding surface 14 and a second air guiding surface 15 extending symmetrically opposite one another relative to the median horizontal plane of the corresponding channel 10.

The upper and lower portions of the segments 10B, 10C of each channel 10 respectively located opposite the first and second guiding surfaces 14, 15 extend parallel to the latter so as to delimit two upper 16 and lower 17 flow paths with a substantially constant section and which are symmetrical relative to the median horizontal plane of the channel 10.

These paths 16 and 17 are respectively able to transport, toward the outlet opening 12, a first and second quantity of air coming from the inlet opening 11.

Each aerator 3, 4 also includes a rectangular deflector fin 18 mounted pivoting in the upstream segment of the channel 10 near the guiding core 13 and along a horizontal transverse axis of rotation A.

This fin 18 is arranged so as to make it possible, by varying its incline, to adjust the ratio between the first and second quantities of air, and therefore the outlet direction of the air flow F relative to the horizontal.

Thus, when the fin 18 occupies its extreme high position illustrated by FIG. 3, the upper flow path 16 is closed. The entire air flow F then circulates in the lower flow path 17 and leaves through the outlet opening 12 while being oriented upward.

Conversely, when the fin 18 is in its extreme low position, the lower flow path 17 is closed. The entire air flow F then circulates in the upper flow path 16 and comes out of the outlet opening 12 while being oriented downward.

When the fin 18 extends horizontally in a position located midway between these two extreme high and extreme low positions (see FIG. 4), the same quantity of air circulates in both the upper 16 and lower 17 flow paths, such that at the outlet, the air flow F is oriented substantially horizontally.

In order to obtain near-perfect sealing and prevent unpleasant whistling from being emitted in the passenger compartment of the vehicle when it is in its extreme high or extreme low position, each fin 18 is provided with a resiliently deformable lip 19 made from elastomer material overmolded at its upstream end.

As illustrated in FIGS. 2 and 3, each aerator 3, 4 further includes a row of parallel vertical deflector fins 20 mounted pivoting in the upstream 10A and intermediate 10B segments of the channel 10 along parallel vertical axes B, and secured in rotation by means of a connecting rod 21 connecting them to one another.

These vertical fins 20 have an upstream portion provided with a V-shaped central indentation 22 passed through by the downstream portion of the fin 18 and the dimensions of which are suitable for not disrupting the pivoting of this fin, as well as a downstream portion formed by two curved arms 23, 24 housed in the two flow paths 16, 17 and the profiles of which substantially correspond to the curved profiles of these channels.

The variation of the incline of these vertical fins 20 makes it possible to adjust the outlet direction of the air flow F relative to the median vertical plane of the aeration device 1.

The pivoting movement of the vertical fins 20 of each aerator 3, 4 is ensured by means of a respective control mechanism 25 installed near its outer end.

Each of the control mechanisms 25 includes an arm 26 housed in the guiding core 13 of the corresponding aerator 3, 4, the downstream end of which is mounted translatably along a horizontal transverse axis C and pivotably about this same axis C.

This downstream end of the arm 26 is extended by a cursor or knob 27 protruding from the outer end of the vertical planar wall 13A forming the beveled downstream end of the core 13 and allowing the user to actuate this arm 26 in translation and pivoting (see FIGS. 1 and 2).

The upstream end of the arm 26 bears a guide finger 28 extending transversely and that is mechanically coupled with a fork 29 rigidly connected to a corresponding fin 18 and extending in its downstream extension, such that the upward or downward pivoting of the knob 27 causes that of this fin 18 in the same direction (FIG. 3).

Each control mechanism 25 also includes a connecting rod (not visible in the figures) connecting, in an articulated manner, the knob 27 to the vertical fins 20 of the corresponding aerator 3, 4, such that the translation of this knob 27 in one direction causes, via this connecting rod, the pivoting of the vertical fins 20 in the same direction.

Figure 4:
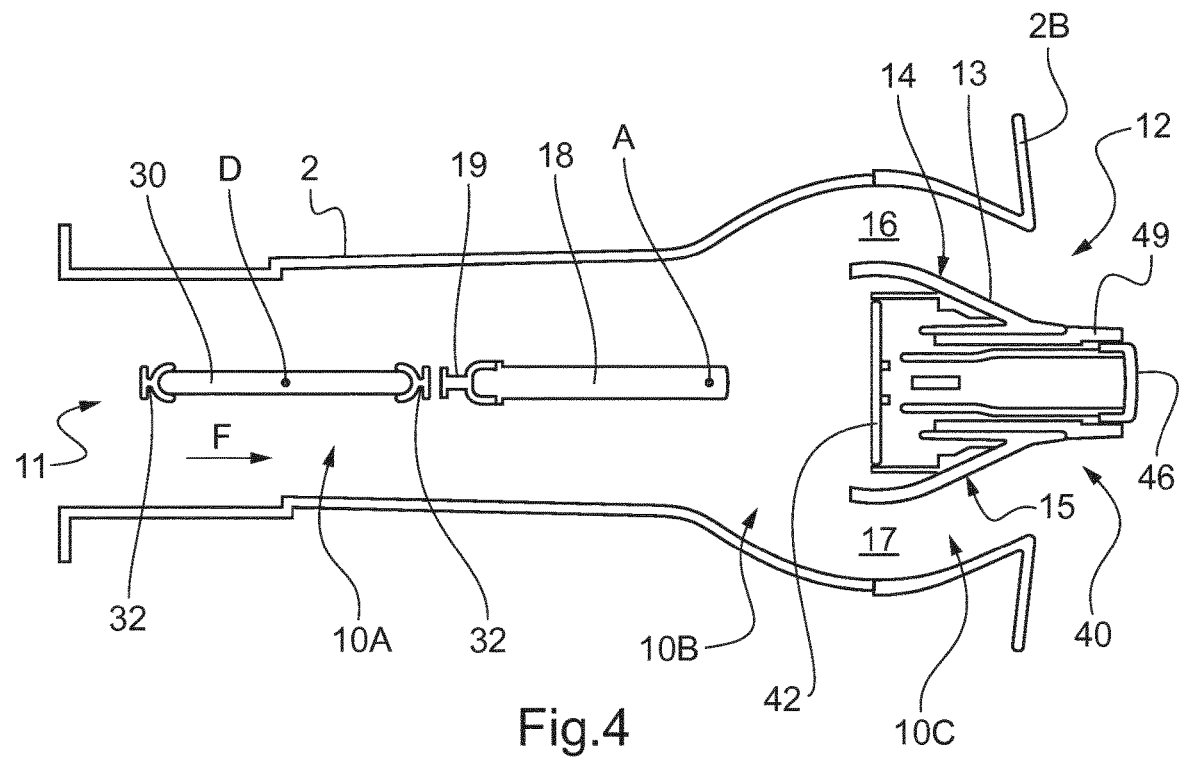
FIG. 4 is a sectional view of the aeration device of FIG. 1 in an axial vertical plane located at a pushbutton for controlling the control module of the heating, ventilation and air conditioning system.

As illustrated in FIGS. 3 and 4, each aerator 3, 4 further includes a respective concealing flap 30 mounted pivoting in the upstream segment of the corresponding channel 10 upstream from the deflector fin 18 and along a horizontal transverse axis of rotation D.

Each flap 30 is controllable by means of a dedicated control mechanism able to be actuated by a respective thumb wheel 31 partially protruding from a corresponding lateral portion of the peripheral support ring 2B bordering the downstream end of the hollow body 2 (see FIGS. 1 and 2), between a maximally open horizontal position and a closed vertical position completely closing off the channel 10 so as to prevent the conveyed air flow F from escaping through the outlet opening 12.

In order to obtain near-perfect sealing and prevent unpleasant whistling from being emitted in the passenger compartment of the vehicle when it is in its closed position, each concealing flap 30 is provided with two resiliently deformable lips 32 made from an elastomer material overmolded at both of its ends.

As shown in FIG. 1 and in order to ensure a continuous appearance between the visible downstream parts of the two hollow guiding cores 13, the latter are connected to one another by a hollow central connecting part 33 of identical section.

As illustrated in FIG. 1, the aeration device 1 includes a control module 40 of the heating, ventilation and air conditioning (HVAC) system of the vehicle, integrated into the two hollow guiding cores 13 and into the central connecting element 33.

This control module 40 includes a control panel 41 extending transversely and continuously between the two aerators 3, 4 (more specifically between the two knobs 27 of the latter) and being formed by the three downstream end walls 13A, 33A of the two hollow guiding cores 13 and the central connecting element 33.

The device 40 also comprises a printed circuit board (PCB) 42 as well as at least one light box 43 housed in the two hollow guiding cores 13 and the central connecting element 33, the light box(es) 43 being inserted between the inner face of the control panel 41 and the printed circuit board 42.

As illustrated in FIG. 1, the control panel 41, which constitutes the visible and accessible part of the control module 40, is provided with a control device comprising three pushbuttons 44, 45, 46 as well as three adjusting rings 47, 48, 49 mounted rotating around the latter.

The first pushbutton 44, installed near the knob 27 of the aerator 3, allows the user to activate or deactivate the automatic operating mode of the HVAC system.

The second pushbutton 45, installed near the knob 27 of the aerator 4, allows the user to activate or deactivate the air conditioning.

The third pushbutton 46, installed at the median vertical plane of the panel 41, allows the user to activate or deactivate the HVAC system.

The first rotary ring 47 surrounding the pushbutton 44 allows the user to adjust the setpoint temperature on the driver's side.

The second rotary ring 48 surrounding the pushbutton 45 allows the user to adjust the setpoint temperature on the front passenger's side.

The third rotary ring 49 surrounding the pushbutton 46 allows the user to adjust the air flow of the HVAC system.

The control panel 41 is advantageously made from a transparent thermoplastic material dyed smoke black, such as polycarbonate (PC) or polymethyl methacrylate (PMMA), the latter offering the advantage of having excellent transparency and not being very sensitive to scratches.

This panel 41 further incorporates several display zones 50, 53 each arranged between two pairs of buttons/rings and being provided with one or several lighted indicators 51, 52, 53 each displaying the selected value of an adjustment parameter of the HVAC system.

The first display zone 50 extending between the first and second pushbuttons 44, 45 comprises:

a first lighted indicator 51, installed near the first pushbutton 44, assuming the form of a numerical display with two digits and one decimal place indicating the selected setpoint temperature on the driver's side; and a second lighted indicator 52, installed near the third pushbutton 46, assuming the form of a functional icon indicating a fan, the number of displayed half-blades of which (in the case at hand between zero and eight) reflects the selected air flow.

The second display zone 53 extending between the second and third pushbuttons 45, 46 comprises a third lighted indicator 54 assuming the form of a numerical display with two digits and one decimal place indicating the selected setpoint temperature for the front passenger's side.

The printed circuit board 42 includes a multitude of electrical detectors able to switch upon the actuation by the user of the pushbuttons 44, 45, 46 and the rings 47, 48, 49 as well as a plurality of light-emitting diodes making it possible to generate backlighting for the lighted indicators 51, 52 and 54.

According to variant embodiments that are not illustrated, the aeration device includes a different number of aerators, for example equal to one or three.

According to other variant embodiments that are not shown, the type and/or number of mechanical control members are different (the buttons and/or thumb wheels for example being able to be replaced by knobs mounted sliding transversely).

According to still other variant embodiments that are not shown, the control device of the control panel 41 comprises at least one touch-sensitive zone control device equipped with touch-sensitive keys and/or buttons. In such a scenario, the control module comprises a capacitive or resistive film affixed against the upstream face of the facade 41 and connected via an electrical connecting web to the printed circuit board 42.

According to still other variant embodiments that are not shown:

the control module also includes a control device making it possible to control other devices of the vehicle, for example deicing of the front windshield and the rear windshield and/or emergency stopping;

the control panel has a lighted animation, for example of the all-terrain type; and/or the downstream ends of the guiding core and the connecting element have a tapered profile: the control panel then being made up of the continuous upper walls of these ends.

Of course, the present invention is not limited to the embodiments described and shown, but also encompasses all variant embodiments within the reach of one skilled in the art.

The invention claimed is:

1. An aeration device for the heating, ventilation and air conditioning system for a motor vehicle, including at least one aerator, comprising:

a channel capable of conveying an air flow from an inlet opening to an outlet opening emerging in an enclosure;

a hollow air guiding core housed in said channel and defining two air guiding surfaces opposite one another, said two guiding surfaces and said channel thus delimiting two flow paths capable of transporting, respectively, to said outlet opening, first and second quantities of air coming from said inlet opening; and a first fin pivotably mounted upstream from said guiding core and arranged so as to make it possible to adjust, as a function of its position, the ratio between the first and second quantities of air, wherein said aeration device includes a control module integrated at least partially into the guiding core of said at least one aerator, said control module comprising a control panel constituted at least partially by a downstream end wall of said guiding core and equipped with a control device making it possible to control the heating, ventilation and air conditioning system.

2. The aeration device according to claim 1, wherein said control device includes at least one pushbutton and an adjusting ring mounted for rotating around said pushbutton.

3. The aeration device according to claim 1, wherein said control device includes at least one movable knob.

4. The aeration device according to claim 1, wherein said control device includes at least one touch-sensitive zone control device.

5. The aeration device according to claim 1, wherein said control panel includes at least one display zone provided with one or more lighted indicators each displaying a value of an adjustment parameter of said heating, ventilation and air conditioning system.

6. The aeration device according to claim 1, wherein said control module includes other control devices making it possible to control other functional devices of said vehicle.

7. The aeration device according to claim 1, wherein said at least one aerator includes a row of second parallel deflector fins pivotably mounted in said channel along axes of rotation perpendicular to an axis of rotation of said first fin and secured in rotation via a connector connecting them to one another.

8. The aeration device according to claim 1, wherein said at least one aerator includes two aerators arranged side by side and separated by a partition and intended to diffuse air in the passenger compartment of the motor vehicle, respectively on the driver's side and on the front passenger's side.

9. The aeration device according to claim 8, wherein said panel extends continuously between the two aerators.

10. A motor vehicle, wherein the motor vehicle includes the aeration device according to claim 1.

11. An aeration device for the heating, ventilation and air conditioning system for a motor vehicle, the aeration device including two aerators, each aerator comprising:

a channel capable of conveying an air flow from an inlet opening to an outlet opening emerging in an enclosure;

a hollow air guiding core housed in said channel and defining two air guiding surfaces opposite one another, said two guiding surfaces and said channel thus delimiting two flow paths capable of transporting, respectively, to said outlet opening, first and second quantities of air coming from said inlet opening; and a first fin pivotably mounted upstream from said guiding core and arranged so as to make it possible to adjust, as a function of its position, the ratio between the first and second quantities of air, wherein said aeration device further includes a control module integrated at least partially into the guiding core at least one of said aerators, said control module comprising a control panel equipped with a control device making it possible to control the heating, ventilation and air conditioning system, wherein said two aerators are arranged side by side and separated by a partition to diffuse air in the passenger compartment of the motor vehicle, respectively on the driver's side and on the front passenger's side, wherein said panel extends continuously between the two aerators and is formed by three downstream end walls, including end walls of the two hollow guiding cores and of a central connecting element.

12. An aeration device for the heating, ventilation and air conditioning system for a motor vehicle, including at least one aerator, comprising:

a channel capable of conveying an air flow from an inlet opening to an outlet opening emerging in an enclosure;

a hollow air guiding core housed in said channel and defining two air guiding surfaces opposite one another, said two guiding surfaces and said channel thus delimiting two flow paths capable of transporting, respectively, to said outlet opening, first and second quantities of air coming from said inlet opening; and a first fin pivotably mounted upstream from said guiding core and arranged so as to make it possible to adjust, as a function of its position, the ratio between the first and second quantities of air, wherein said aeration device includes a control module integrated at least partially into the guiding core of said at least one aerator, said control module comprising a control panel constituted at least partially by a downstream end wall of said guiding core and equipped with a control device making it possible to control the heating, ventilation and air conditioning system, wherein each aerator further includes a respective concealing flap pivotably mounted upstream from the first fin.

* * * * *